US011120781B2

(12) United States Patent
Recchia (10) Patent No.: US 11,120,781 B2
(45) Date of Patent: Sep. 14, 2021

(54) SYSTEM AND METHOD FOR A VISUALIZING CHARACTERISTICS OF AN AUDIO EVENT (71) Applicant: inMusic Brands, Inc., Cumberland, RI (US)

(72) Inventor: Daniel Recchia, East Providence, RI (US)

(73) Assignee: InMusic Brands, Inc., Cumberland, RI (US)

(*) Notice: Subject to any disclaimer, the term of this patent is extended or adjusted under 35 U.S.C. 154(b) by 0 days.

(21) Appl. No.: 16/685,559

(22) Filed: Nov. 15, 2019

(65) Prior Publication Data
US 2021/0151015 A1 May 20, 2021

(51) Int. Cl.
G10H 1/00 (2006.01)
G10D 13/10 (2020.01)
G06F 3/0354 (2013.01)
G10H 1/46 (2006.01)

(52) U.S. Cl.
CPC ........ *G10H 1/0008* (2013.01); *G06F 3/03547* (2013.01); *G10D 13/26* (2020.02); *G10H 1/46* (2013.01); *G10H 2220/046* (2013.01); *G10H 2220/066* (2013.01); *G10H 2230/281* (2013.01)

(58) Field of Classification Search
CPC ........ G10H 1/00; G10H 1/0008; G10H 3/146; G10H 2220/411; G10H 2220/061; G10H 2230/275; G10H 1/0553; G10H 2220/046; G10H 2230/305; G10H 2220/305; G10H 2220/026; G10H 2230/281; G10H 2230/285; G10H 2230/291; G10H 2210/155; G10H 1/368; G10H 2220/021; G10H 2220/031; G10H 2220/086; F21L 4/027; F21L 15/02; F21L 2/00; G10D 13/02
See application file for complete search history.

(56) References Cited

U.S. PATENT DOCUMENTS

| 4,479,412 | A  | * | 10/1984 | Klynas | G10H 3/143 84/730 |
| 6,399,869 | B1 | * | 6/2002 | Sagastegui | G10H 1/0016 84/104 |
| 8,198,526 | B2 | * | 6/2012 | Izen | G10H 3/146 84/743 |
| 8,697,973 | B2 |   | 4/2014 | Souppa et al. | |
| 9,424,827 | B2 |   | 8/2016 | Gill et al. | |
| 2001/0008100 | A1 | * | 7/2001 | Devecka | A63F 13/46 84/738 |
| 2004/0060427 | A1 | * | 4/2004 | Franco | G10H 3/146 84/730 |

(Continued)

Primary Examiner — Marlon T Fletcher
(74) Attorney, Agent, or Firm — Burns & Levinson LLP (57) ABSTRACT An electronic percussion device has a plurality of touch sensitive pad, an array of lighting elements disposed adjacent each pad, and a virtual display of the currently selected kit. The light array provides the user with immediate visual cue about the status and capabilities of the sound selections, without having to interrupt the user's performance. The user can color code and animate the illumination pattern of each light array so that, from a distance, the user is visually reminded what sounds are assigned to each pad, when sound associated with particular pad is currently playing, when playback of a sound associated with a pad is about to end.

28 Claims, 9 Drawing Sheets (56) References Cited

U.S. PATENT DOCUMENTS

| | | | |
|---|---|---|---|
| 2004/0074375 A1* | 4/2004 | Moffatt | G10H 1/0058 |
| | | | 84/464 A |
| 2010/0064880 A1* | 3/2010 | Takehisa | G10H 1/24 |
| | | | 84/609 |
| 2010/0064881 A1* | 3/2010 | Takehisa | G10H 3/146 |
| | | | 84/609 |
| 2013/0192448 A1* | 8/2013 | Yanagawa | G10H 1/0008 |
| | | | 84/615 |
| 2013/0239787 A1* | 9/2013 | McMillen | G10H 1/34 |
| | | | 84/643 |
| 2015/0009417 A1* | 1/2015 | Jargiello, III | F21V 33/0056 |
| | | | 348/789 |
| 2018/0158440 A1* | 6/2018 | Kroehling | G10H 1/32 |

\* cited by examiner

SYSTEM AND METHOD FOR A VISUALIZING CHARACTERISTICS OF AN AUDIO EVENT

FIELD OF THE INVENTION

The disclosure relates to electronic musical instruments, and, more particularly, to electronic percussion devices capable of triggering an audio event.

BACKGROUND OF THE INVENTION

Electronic percussion devices are utilized alone or in conjunction with acoustic percussion instruments to enhance a percussionist's ability to create a musically encompassing experience. Such devices are typically used for initiate an audio event such as the dynamic generation of sound, playback of previously recorded audio samples. In the case of audio samples, such audio samples may include samples of single or multiple sounds or an extended duration sample of multiple audio events intended to be played sequentially after initiation of playback, e.g. an audio loop or backing track. As such, the timing of percussive audio events has evolved from predominately relatively short and events to include extended events, all of which need to be synchronized by the percussionist while continuing to keep rhythmic time during a musical performance. It can be difficult to monitor the status of so many audio events, not just their respective timing but also their respective amplitude characteristics, just from listening, particularly from a mixture of both acoustic sounds and electronically amplified sounds, such as those triggered from an electronic percussion device. This problem is further exacerbated by the ability of electronic percussion devices to trigger any of multiple different audio events. In addition, percussionists are often unable to access their electronic percussion devices because they are holding drumsticks while playing, and also often forced to place the device at a distance due to constraints from other acoustic drum components around them.

Accordingly, a need exists for visual cues associated percussive audio events to assist a percussionists in understanding the synchronization and playback characteristics of audio events triggered from an electronic percussion device.

A further need exists for advanced visual cues associated with the playback characteristics of audio events triggered from an electronic percussion device.

A still further need exists for electronic percussion device that enables a user to select the type of visual cue associated with audio events triggerable from the electronic percussion device.

Another need exists for an array of lighting elements that provides visual cues translatable into valuable information from a distance during a performance.

SUMMARY OF THE INVENTION

Disclosed is an electronic percussion device has a plurality of touch sensitive pad, an array of lighting elements disposed adjacent each pad, and a virtual display of the currently selected kit. The light array provides the user with immediate visual cue about the status and capabilities of the sound selections, without having to interrupt the user's performance. The user can color code and animate the illumination pattern of each light array so that, from a distance, the user is visually reminded what sounds are assigned to each pad, when sound associated with particular pad is currently playing, when playback of a sound associated with a pad is about to end, and other creative uses. More particularly, disclosed is an electronic percussion device comprising multiple electromechanical touch sensitive pads, each of which is capable of triggering an audio event, such as playback of a previously stored audio data sample, upon being physically struck or receiving an electronic trigger signal. Associated with each pad is an adjacent light array of multiple lighting elements, typically Light Emitting Diodes (LEDs), covered with a diffuser element. A user interface in the form of a graphic display and/or multiple dedicated controls enables a user to associate any of a plurality of prerecorded audio data files with each of the respective pads, define various parameters of the audio file playback characteristics, and select from one of more patterns for illuminating the array of lighting elements associated with a particular pad. A processor and/or micro controller and supporting control circuitry within the electronic percussion device directs audio events and illumination patterns, once triggered at the respective pads. For example, a user may program the controller to change a brightness level of the LEDs in relation to the force with which the pad is struck. Such brightness level may change uniformly for all LEDs in the array from a first brightness level to a second brightness level upon striking of the pad, or, a user may program the controller to change a brightness level of the LEDs directionally among adjacent LEDs in the array to dynamically indicate any of audio signal volume, sample playback duration, or even playback rhythm if triggering of the pad is synchronized to a clock signal, such as a MIDI clock signal from an external device. As such, by selectively illuminating less than all of the plurality of lighting elements associated with the pad and various animation effects may be achieved which can be associated with different operational statuses of the pad or in any audio event triggered there by.

According to one aspect of the disclosure, a system for a visualizing characteristics of an audio event comprising: an actuator triggerable for initiating an audio event having a plurality of characteristics; plurality of lighting elements associated with the actuator and arranged proximate thereto; and a controller operatively coupled to the actuator and the plurality of lighting elements and responsive to user defined criteria identifying illumination characteristics of the plurality of lighting elements, the controller further having an operational mode to control the illumination characteristics of the plurality lighting elements upon triggering of the actuator.

According to another aspect of the disclosure, a method for a visualizing characteristics of an audio signal comprises: A) providing a system comprising: i) an actuator triggerable for initiating an audio event having a plurality of characteristics; ii) a plurality of lighting elements associated with the actuator and arranged proximate thereto; iii) a controller operatively coupled to the actuator and the plurality of lighting elements and responsive to user criteria defining lighting characteristics of the plurality of lighting elements upon playback of then audio signal; B) receiving user criteria defining lighting characteristics of the plurality of lighting elements; and C) selectively illuminating the plurality of lighting elements in accordance with the user criteria upon triggering of the audio event associated with the pad.

According to yet another aspect of the disclosure, a system for a visualizing characteristics of an audio event comprises: an actuator triggerable for initiating an audio event having a plurality of characteristics; a plurality of lighting elements associated with the actuator and arranged proximate thereto; a memory for storing a plurality control signal patterns capable of controlling illumination characteristics of the plurality lighting elements; and a controller operatively coupled to the actuator, the memory and the plurality of lighting elements and responsive to user defined criteria identifying one of the control signal patterns, and operational to control the illumination characteristics of the plurality lighting elements upon triggering of the actuator, wherein, in in at least one of the plurality of control signal patterns, at least one but less than all of the plurality of lighting elements associated with the actuator are illuminated simultaneously during the audio event.

Also disclosed is an electronic percussion device having a plurality of triggerable actuators, in the form of any of pads, external trigger inputs or foot switches, that may be organized into synchronized groups, and has an operational mode in which triggering of any actuator within the synchronized group initiates playback of audio events or execution of control functions associated with other of the actuators within the synchronized group in one of multiple different synchronization orders, e.g. one at a time, all simultaneously, random or in a predefined or user-defined consecutive order.

The electronic percussion device may have an operational mode in which a pad may have the ability to trigger the audio events associated with other pads in a user defined group in different synchronization modes, e.g. simultaneously or in different sequential orders. More specifically, the disclosed device has the ability to assign any and all actuators, i.e. pads, external trigger inputs, and footswitches, to a synchronization group, and has multiple methods of playback on the groups, including a Cycle mode in which hitting any actuator in the group will cycle automatically in a consecutive order through all the audio events associated with each pad assigned to the group consecutively. Such consecutive order may be predefined or customizable by the user. In another mode, the Random mode, in which repeated hitting any pad in the group will cycle automatically in a random order through all the audio events associated with each pad assigned to the group. With a together setting, up to nine pads in the sync group will play at the same time, with the triggering of only one of the actuators within the sync group. Such synchronization of actuators enables a percussionist to get more complex and musical sounds and performances while requiring limited user interface access and additional thought, effectively allowing a user can to repeatedly trigger one pad and have it trigger a cycled or random sequence, therein a musical phrase.

According to yet another aspect of the disclosure, an electronic percussion device comprises: a plurality of triggerable actuators, each actuator having associated therewith one of an audio sample playable upon triggering thereof or a control function operable upon triggering thereof; a memory for storing the audio sample or control function associated with each of the plurality of triggerable actuators; and a controller operatively coupled to the plurality of triggerable actuators and memory and having an operational mode capable of initiating one of playback of the audio sample or operation of the control function associated with each of the plurality of actuators in a sequential order by repeated re-triggering of a single of the plurality of actuators.

DETAILED DESCRIPTION

The present disclosure will be more completely understood through the following description, which should be read in conjunction with the drawings. In this description, like numbers refer to similar elements within various embodiments of the present disclosure. The skilled artisan will readily appreciate that the methods, apparatus and systems described herein are merely exemplary and that variations can be made without departing from the spirit and scope of the disclosure. The terms comprise, include, and/or plural forms of each are open ended and include the listed parts and can include additional parts that are not listed. The term and/or is open ended and includes one or more of the listed parts and combinations of the listed parts.

Figure 1:
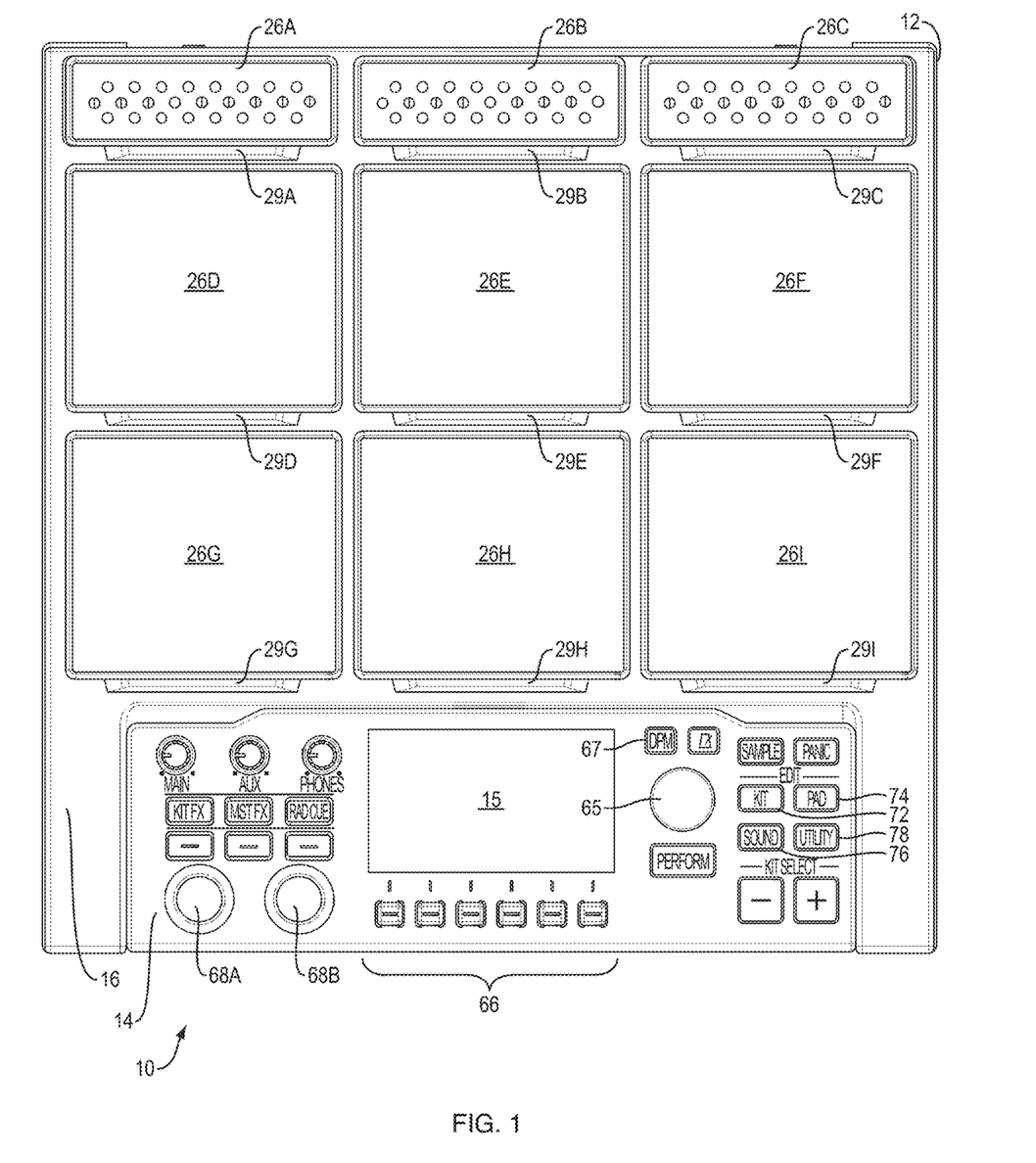
FIG. 1 illustrates conceptually a top plan view of an electronic percussion device in accordance with the disclosure.
Figure 2:
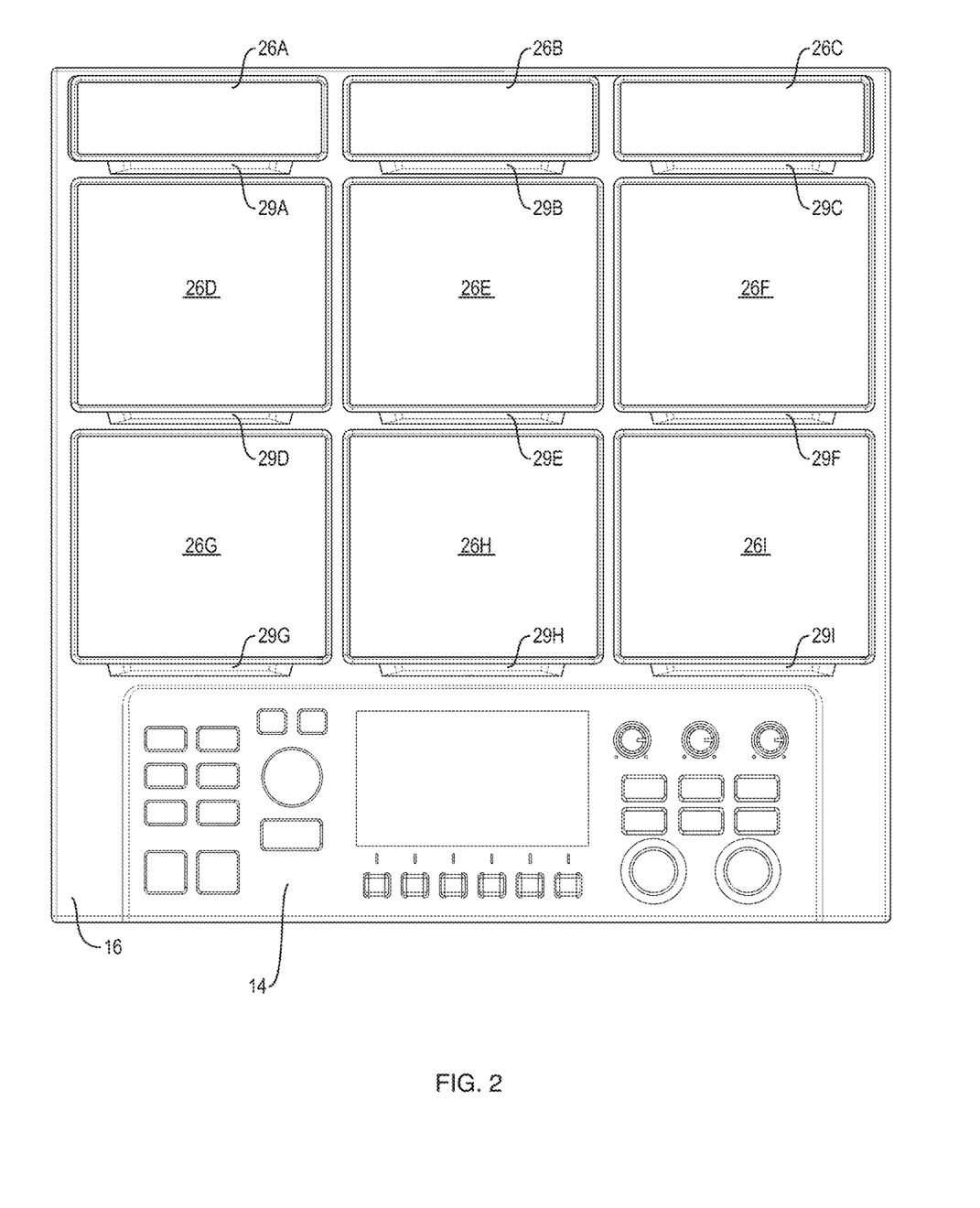
FIG. 2 illustrates conceptually the play surface and user interface of the electronic percussion device of FIG. 1 in accordance with the disclosure.
Figure 7:
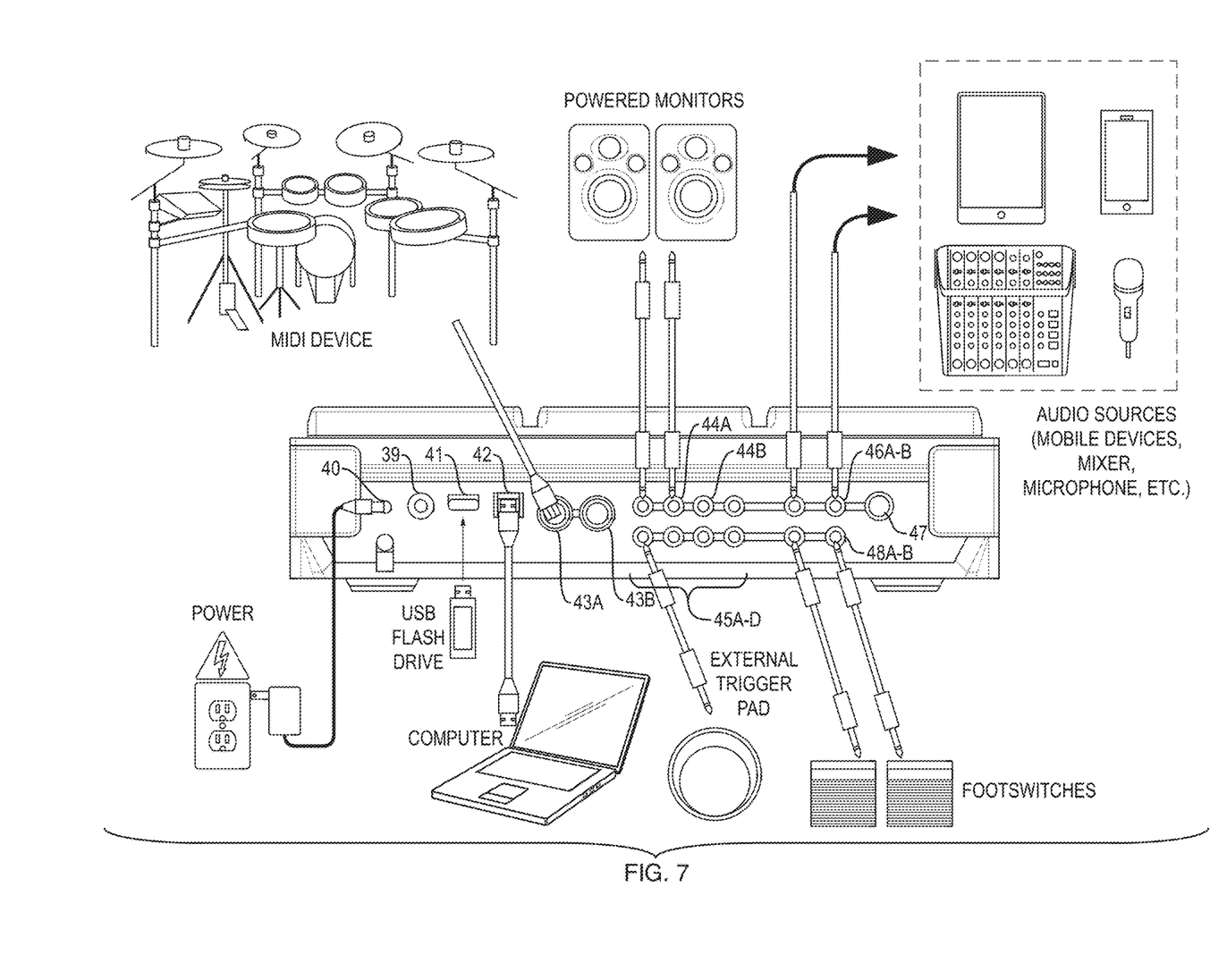
FIG. 7 illustrates conceptually a rear plan view of the electronic percussion device of FIG. 1 connectable to external devices in accordance with the disclosure.

FIGS. 1 and 7, inter alia, illustrate an electronic percussion device 10 capable of implementing the methods and techniques described herein. A device suitable for implementing the subject matter disclosed herein is the Alesis Strike MultiPad, commercially available from inMusic Brands, Inc. of Cumberland, R.I., 02864. Percussion device 10 comprises a playing surface 16, a user interface 14, and a housing 12 encompassing the processing, memory, audio interface and control functions which communicate with the user interface 14 and playing surface 16 and other devices external to device 10. In one embodiment, the surface of user interface 14, including display 15 and the various controls, is offset at a different level from that of the playing surface 16 so as to prevent inadvertent striking or hitting of the user interface 14 during use. Each of the major components of percussion device 10 described in greater detail herein.

User interface 14, includes the various dedicated controls, such as potentiometers, encoders, soft switches, a display, etc. capable of interfacing with the internal processing, memory, audio interface and control and logic components of device 10. In embodiments, user interface 14 comprises a display 15, which may be implemented with a full-color LCD display, capable of providing visual information for editing kits, pad parameters, effects and samples and further is capable of presenting a variety of information, virtual controls and status indicators, through a variety iconic, graphic, textual and color-coded elements. A plurality of function buttons 66 disposed beneath display 15 for selecting various virtual navigation icons viewable through display 15. A display encoder button 65 is provided for scrolling through settings and parameters displayed on display 15 and for editing the same. A plurality potentiometers 60-61 control the volume level of the main and auxiliary audio outputs 44A-B, respectively, audio interface, as illustrated in FIG. 7. A potentiometer 62 controls and headphone outputs 37. A pair of encoders 68A-B are provided to control pad parameters or effects parameters as well as to scroll through banks of assignments of pads to audio samples and light array modes. A dedicated BPM button 67 is provided to set the beats per minute of a reference rhythm and time signature. A dedicated Kit button 72 is provided to view all kits and edit their respective settings. A dedicated Pad button 74 is provided to edit pad audio level settings, the settings of the light array associated with the pad, the pad responsiveness, and the output routing of the pad. A dedicated Sound button 76 is provided to enable browsing and editing of audio sample stored in the memory of device 10. A dedicated Utility button 78 is provided to edit global settings of the device 10 and to facilitate backup of user data. Other additional controls, dedicated or otherwise may be present, as illustrated for additional functionality.

Referring again to FIGS. 1-3B, the playing surface 16 comprises a plurality of pads 26A-I. Each of pads 26 maybe implemented with a touch sensitive electromechanical pad having a design capable of triggering an audio event, such as playback of a prerecorded audio data file, upon being physically striking with a force, typically of a drumstick, hand or other object, or triggered by an electronic trigger signal generated from a source internal or external to the percussion device 10. In embodiments, pads 26A-1 may or may not have the same implementation as far as size, shape, surface texture, or programmable sensitivity options. The design and function of such pads are known and understood in the relevant arts.

Each of pads 26A-I has associated therewith a light array 29A-1, respectively. In the illustrated embodiment, each of light arrays 29A-I is disposed below its respective pad 26A-I, however, the location of one or more of light arrays 29A-1 may be above or adjacent each pad 26, as well as grouped together as part of the user interface 14. In embodiments, each of light arrays 29 comprises a plurality of lighting elements 28A-D optically coupled to a diffuser element 32. In embodiments, each of lighting elements 28A-D may be implemented with a Light Emitting Diode (LED). Although each array 29 is disclosed as having four individual lighting elements 28, in the illustrative embodiment, other numbers of multiple lighting elements, e.g., 5, 6, 7, 8, etc., are possible. In embodiments, each of the respective LEDs may be implemented with a currently commercially available Red Green Blue (RGB) LED which has the ability to not only modulate a brightness level or intensity but color as well. In the illustrated embodiment, each of the LEDs may assume as many as seventeen different colors as well. In embodiments, such colors make comprise any of red, coral, deep pink, light pink, magenta, purple, plum, blue, sky blue, cyan, aquamarine, lime, green, yellow, orange, orange red, and white, or for solid colors. In embodiments, the brightness intensity and color of each of lighting elements 28A-D is separately and individually controllable by signals from processor 50 and/or controller 56 in accordance with one of the predefined patterns stored in memory and selectable by the user through user interface 14, as explained in greater detail hereinafter.

In embodiments, each diffuser element 32 may be made of any number of known rigid, semi-rigid or flexible materials having transparent or translucent optical properties capable of diffusing light generated by the lighting elements of each light array 29, in a manner which is more visually aesthetic to the viewer. With the various lighting modes described herein, it is possible to achieve various animation effects by the modulation of the intensity and/or color of the underlying lighting elements which when diffused through the diffuser create a smooth animation effect. For example, in FIGS. 3A-B, sequential, brief illumination of lighting element 28A, followed by similar lighting of lighting element 28B, followed by similar lighting of lighting element 28C, followed by similar lighting of lighting element 28D, would create an animated pattern giving the illusion of motion, similar to that illustrated in FIG. 3B in which lighting element 28A has a likely lowest level brightness intensity, with lighting elements 28B and 28C having progressively higher brightness intensities and with lighting element 28D having a highest level brightness intensity. A similar process may be performed to programmable he changed the color of the lighting elements 28A-D to create an animated motion effect in color alone or in addition to animation in brightness levels of the lighting elements 28A-D.

In one implementation, the playing surface 16, including the striking surface of pads 26A-I and diffuser elements 32 of each light array 29A-I may be formed of a single flexible sheet comprising any of an natural or synthetic latex, natural or synthetic resins, or, a combination thereof, such sheet being secured to housing 12.

Figure 8:
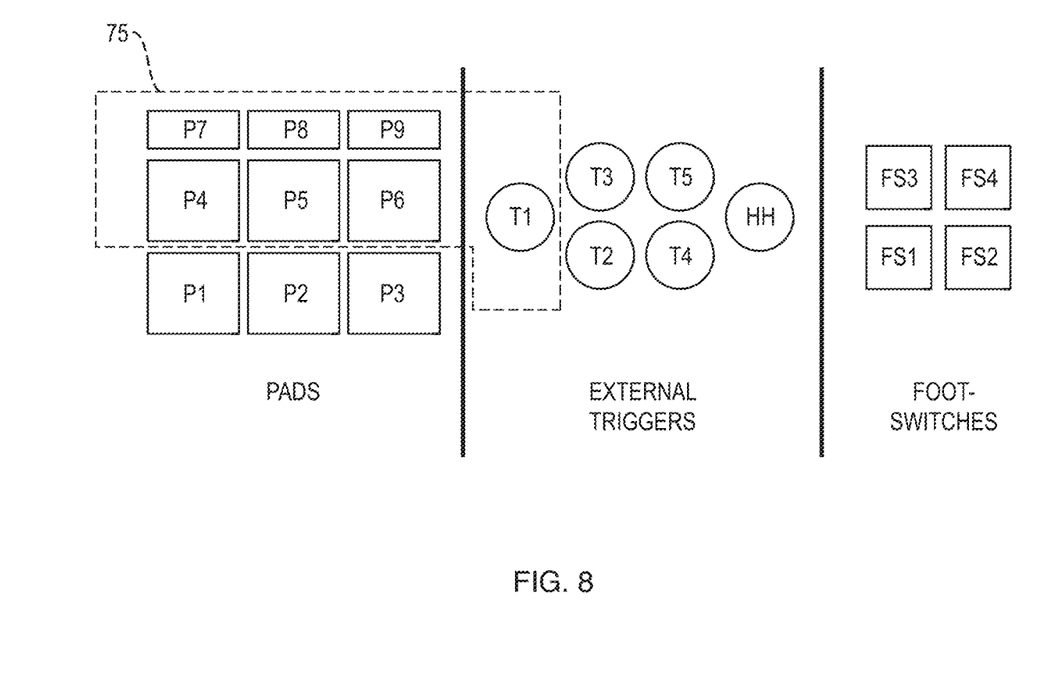
FIG. 8 illustrates conceptually a plurality of pads, triggers and switches which may be grouped for triggering in a consecutive or random order from a single actuator in accordance with the disclosure.

According to one aspect of the disclosure, the electronic percussion device 10 is capable of displaying through display 15 a virtual or iconic representation of a selected predefined or user-defined kit, including each of the pads associated therewith. As used herein, a "kit" comprises the collective group of assignments of audio samples to any of a pad, trigger, or footswitch and may include additional settings such as the color and illumination animation pattern associated with each pad 26 within the kit. As used herein, an "actuator" may be any of a pad, trigger, or footswitch, or equivalents thereof, which may have user definable or preprogrammed parameters, in accordance with the disclosed device and techniques. FIG. 8 illustrates conceptually the plurality of actuators comprising pads P1-9, external triggers T1-6, and foot switches FS1-4, all of which may function and have the same programmable parameters as pads 26A-I, including being defined as parts of a kit and an arranged into a subgroup 75 for synchronization purposes, even though only nine pads are physically present on playing surface 16 of device 10, with the other actuators being triggered through audio interface 35 externally of device 10. The subgroup 75 is for illustrative purposes only and is not meant to be limiting. Other groupings or sub-groupings of the actuators may be made at the user's discretion.

Figure 4A:
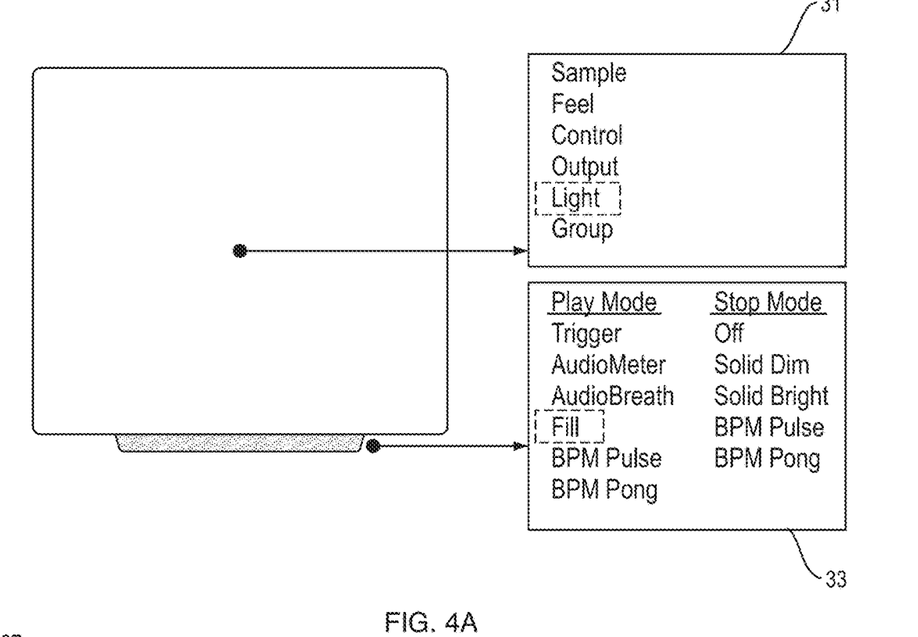
FIG. 4A illustrates conceptually a single pad and adjacent lighting array and the various programmable parameters associated with each in accordance with the disclosure.
Figure 4B:
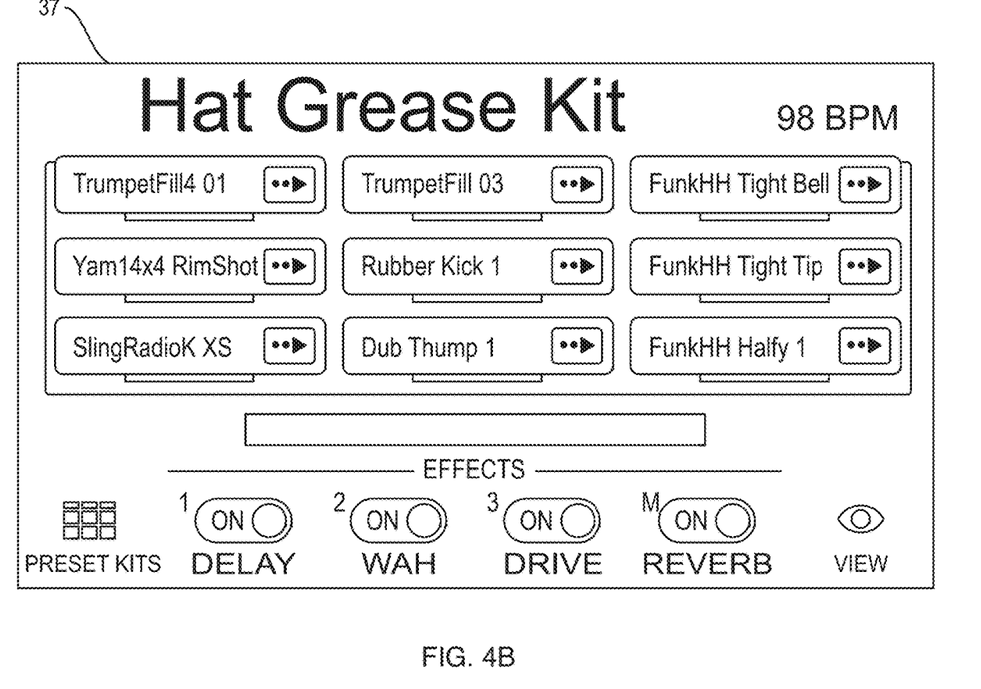
FIG. 4B illustrates conceptually a virtual image of the playing surface and the various programmable parameters associated with each pad in accordance with the disclosure.

Referring to FIGS. 4A-B, each pad 26A-I has associated therewith menu pages displayable through display 15 of user interface 14 which can be utilized to view and edit all pad related parameters which are stored in a data structure 53 in system memory 55. The various function buttons 66 of user interface 14 may be selected to access the appropriate user definable menus for display in display 15 to view and edit any of the feel, e.g. the playing dynamics of the pad, the control, e.g., the control mode for each pad as well as whether sound will play or not, the audio output of the pad, e.g. to control the audio output of the pad, and the light settings, e.g. to control the lighting elements associated with each pad. For example, a menu associated with the "Perform" mode of operation may presents a graphical or iconic indication of the nine pads, or alternatively the external trigger inputs and footswitches. In FIG. 4A, a pad is represented conceptually. Through the virtual display of user interface 14, a user can select the "Light" settings from menu 31 which then enables, in the "Play Mode," selection of the "Fill" light mode from menu 33, as explained in greater detail herein.

FIG. 4B illustrates a sample virtual image 37 as would be displayed by display 15 for a kit entitled "Hat Grease Kit." The virtual display comprises a graphic representation of each pad/trigger/footswitch in the kit and its respective light array, the name of the audio sample currently associated therewith, and the currently selected color. Also shown is an iconic representation illustrating the event to occur upon triggering of the pad, as follows: "+" icon if the pad is used to configure a control function; a "O" icon if the pad is used to trigger a loop playback; a solid right arrow icon if the pad is used to trigger a one-shot playback of an audio sample; a hollow right arrow icon if the pad is used to trigger a one-shot alternative. If a pad is set to a control function, the name of that control function will be displayed in association with the pad representation, e.g. "Next Kit." If the pad is set to trigger playback of a sample, e.g. an audio event, the name of the audio file will be displayed in association with the pad representation, as illustrated. In embodiments, the display 15 of user interface 14 may be large enough to provide adequate visual assistance to the percussionist when set amongst their respective percussion instrument configuration. In the illustrated embodiment display 15 may have a length mention of 4 inches. As such, the display 15 provides visual feedback to the user about what will happen before striking pad 26, in addition to the visual cues provided by each of the light arrays 29 on the playing surface 16. These aspects help to avoid playing the wrong sound, forgetting what sound is assigned to a pad, or generally forgetting what kit is selected or sound currently playing.

According to one aspect of the disclosure, the illumination characteristics of the lighting elements 28 may comprise any of illumination activation, one of multiple brightness levels, one of multiple color, and duration of illumination. Accordingly, each array 29 of lighting elements 28 may assume a variety of behavioral characteristics enabling the array to generate an animated visual cue, including, but not limited to, all lighting elements 28 within the array 29 having uniform illumination status, e.g. on/off, color, and brightness level, or, all lighting elements 28 within the array 29 having of non-uniform illumination status, e.g. on/off, color, and brightness level, enabling lighting elements 28 arranged adjacent to each other to be serially or directionally activated and controlled to create the animation patterns, as described in more detail herein.

In accordance with the disclosure, the function of the lighting elements 28 can be customized by the user in two operational states. The first operational state, the "Play" operational mode is used to render the color and animation pattern of the lighting elements 28 of a pad 26 whose audio sample playback control function has been triggered. The second operational state is associated with a pad 26 while no audio sample sound is playing back or no function has been selected, referred to herein as the "Stop" operational mode.

Figure 3A:
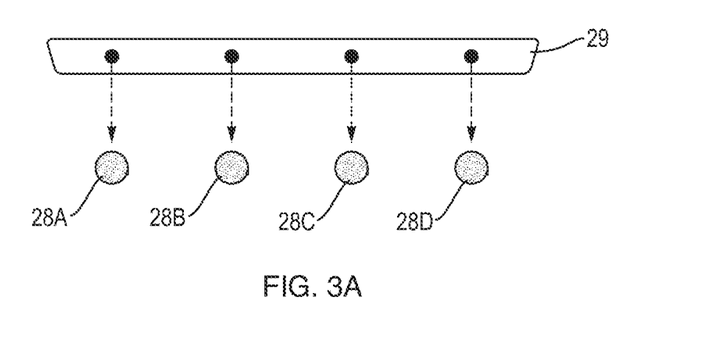
FIG. 3A illustrates conceptually the individual lighting elements comprising a lighting array in accordance with the disclosure.
Figure 3B:
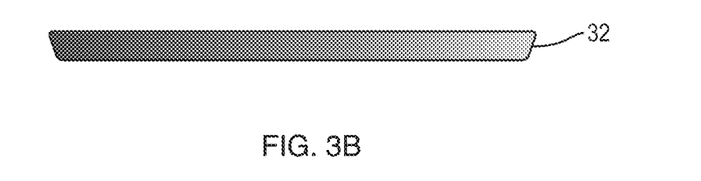
FIG. 3B illustrates conceptually a lighting array and diffuser in accordance with the disclosure.
Figure 3C:
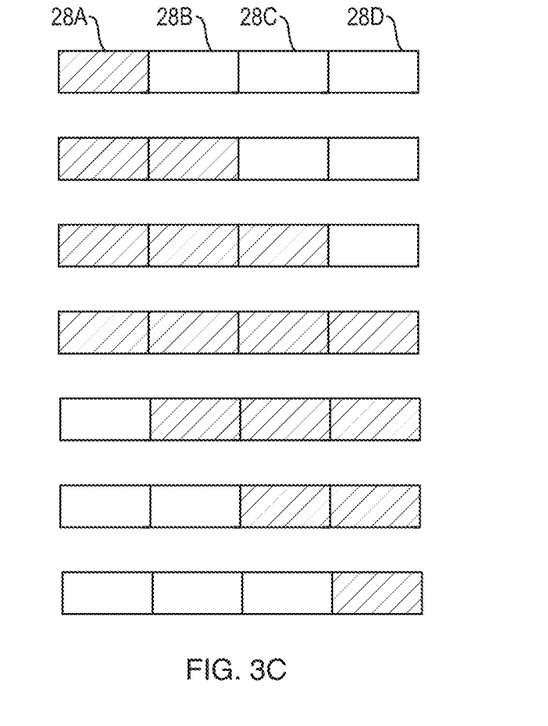
FIG. 3C illustrates conceptually a lighting array in multiple, time-elapsed stages showing the illumination pattern which creates an effect of animation in accordance with the disclosure.

Through user interface 14, the user can select from one of seventeen RGB mix colors; one for the Play operational mode and one for Stop operational mode of each pad 26A-I. In addition to the color selection in the Play operational mode, the user can select from one of several animation patterns to be associated with lighting elements 28 associated a pad 26. The animation modes are patterns of control signals stored in memory 55 and/or control 56 which enable selective changes in the illumination characteristics, e.g. the brightness level and/or color of the multiple lighting elements 28A-D in the array 29. In the illustrative embodiment, in the Play operational mode, a number of directional or motion based animation patterns may be selected by the user for each different pad, including the following:

"Fill" animation pattern causes the adjacent of lighting elements 28A-D in an array 29 to be sequentially illuminated from left to right and back, or vice versa, based on the duration of the time of the audio sample being played back. The Fill animation pattern provides the user with an immediate visual indication of the progress of the audio signal playback, which is especially useful for playing back longer loops or backing tracks, warning the user when a track will end, or a loop repeat. In embodiments, the speed of sequential illumination in the fill animation pattern is synchronized with the duration of the audio event. FIG. 3C illustrates conceptually a lighting array in multiple, time-elapsed stages showing the illumination pattern which creates an effect of animation, with the illuminated elements in dark shading. For example, in FIG. 3C, the plurality of lighting elements 2A-D of an array 29 associated with a pad 26 are illustrated in the process of being sequentially illuminated and unilluminated during the duration of an audio event, e.g. playback of a sample, loop, or backing track. As can be seen illumination pattern starts progressively from left to right with the illumination of lighting element 28 *a* and progresses until all lighting elements are illuminated followed by sequential turning off of lighting elements until only lighting element 20 8D is illuminated just prior to termination of the audio event or playback. In this manner, the light array 29 provides an animated pattern serving as a visual cue providing indication of the upcoming end of playback of the audio sample.

"Audio Meter" animation pattern causes adjacent of the lighting elements 28A-D in an array 29 move directionally, typically left to right, dynamically as a representation of a signal meter indicating the volume level of the audio signal being played back in association with the pad.

"BPM Pong" animation pattern causes a single of the lighting elements 28A-D in an array 29 to move directionally, typically left to right, according to the time signature and tempo of the currently selected kit, as defined by the user of by default preset.

Additionally, in the illustrative embodiment, in the Play operational mode, a number of non-directional animation patterns may be selected by the user for each different pad, including the following:

"Trigger" animation pattern causes multiple illuminated of the lighting elements 28A-D in an array 29, typically all lighting elements 28A-D in unison, to change from a first brightness level to a second brightness level, e.g. from dim to bright, when play back of an audio sample is trigger with the respective pad 26.

"Audio Breath" animation pattern causes multiple illuminated of the lighting elements 28A-D in an array 29, typically all lighting elements 28A-D in unison, to change from a first brightness level to a second brightness level, e.g. from dim to bright, to change from a first brightness level to a second brightness level, e.g. from dim to bright, in relationship with the volume level of the audio signal being played back in association with the respective pad 26.

"BPM Pulse" animation pattern causes multiple illuminated of the lighting elements 28A-D in an array 29, typically all lighting elements 28A-D in unison, to change from a first brightness level to a second brightness level, e.g. from dim to bright, to change from a first brightness level to a second brightness level, e.g. from dim to bright, according to the time signature of the currently selected kit, as defined by the user of by default preset.

"Off" animation pattern causes multiple illuminated of the lighting elements 28A-D in an array 29, typically all lighting elements 28A-D in unison, to remain at the currently selected Stop mode setting when play back of an audio sample is trigger with the respective pad 26.

In the illustrative embodiment, in the Stop operational mode, a number of directional animation patterns may be selected by the user for each different pad, including the BPM Pulse and BPM Pong animation patterns described herein, as well as the following:

"Off" animation pattern causes multiple illuminated of the lighting elements 28A-D in an array 29, typically all lighting elements 28A-D in unison, to remain off or not illuminated when play back of an audio sample is trigger with the respective pad 26.

"Solid Dim" animation pattern causes multiple illuminated of the lighting elements 28A-D in an array 29, typically all lighting elements 28A-D in unison, to remain illuminated to a dim brightness level of an assigned color associated with the respective pad 26.

"Solid Medium" animation pattern causes multiple illuminated of the lighting elements 28A-D in an array 29, typically all lighting elements 28A-D in unison, to remain illuminated to a medium brightness level of an assigned color associated with the respective pad 26.

"Solid Bright" animation pattern causes multiple illuminated of the lighting elements 28A-D in an array 29, typically all lighting elements 28A-D in unison, to remain illuminated to a high brightness level of an assigned color associated with the respective pad 26.

Figure 5:
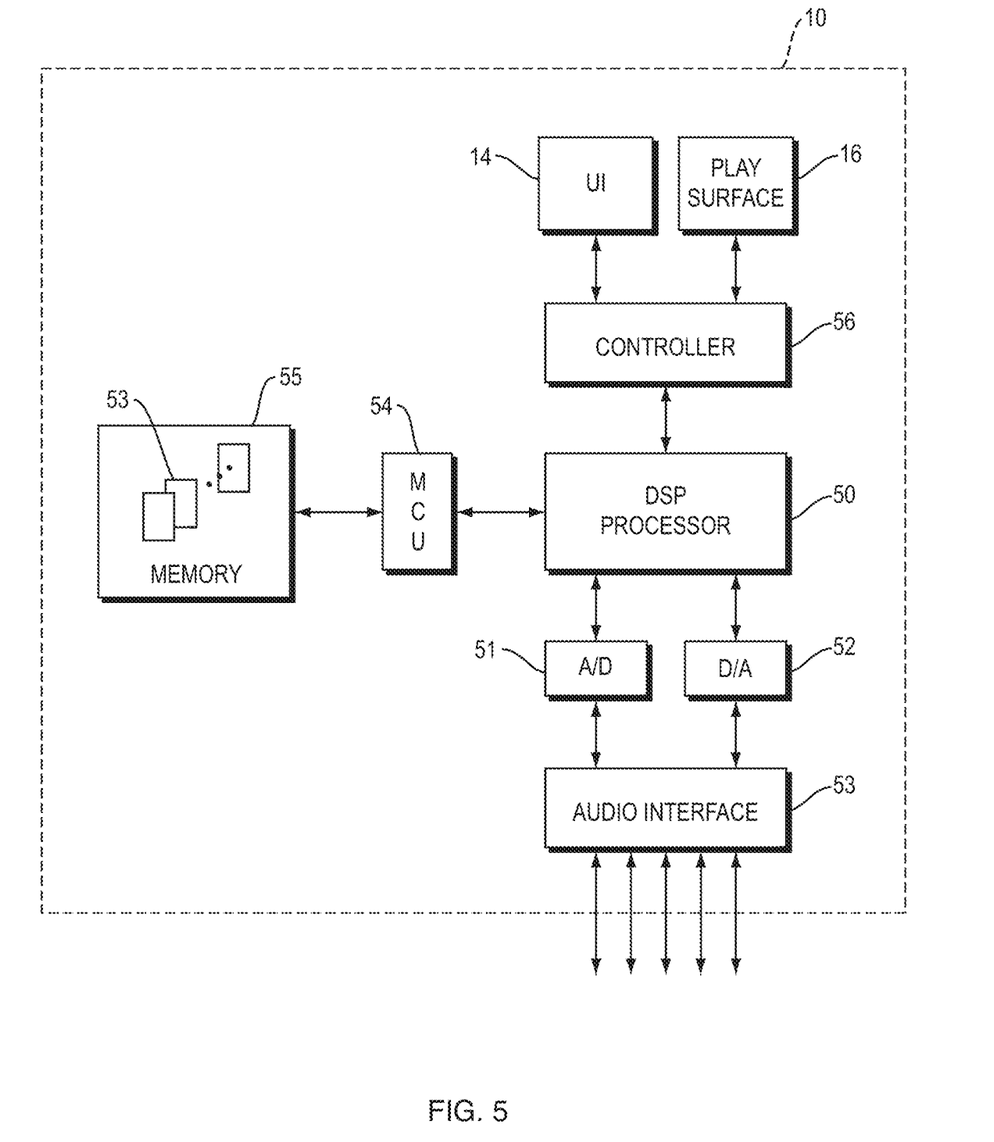
FIG. 5 illustrates conceptually a block diagram of internal architecture of the electronic percussion device of FIG. 1 in accordance with the disclosure.

FIG. 5 illustrates conceptually a block diagram of internal architecture of the electronic percussion device 10. Percussion device 10 comprises a playing surface 16, a user interface 14, processor 50, controller 56, memory 55 and memory control unit 54, analog-to-digital and digital-to-analog converters 51 and 52, respectively, audio interface 53 and other controller elements which communicate with the user interface 14 and playing surface 16 and other devices external to device 10. In one implementation the processor 50 comprises a special purpose digital signal processing (DSP) chip including any associated RAM, ROM, working registers and other associated memory. Processor 50 communicates with external devices through a pair of analog-to-digital and digital to analog converters 51 and 52, respectively, and audio interface 53 which contains various port configurations, as described with reference to FIG. 7, audio busses and signal mixing circuitry, as applicable. Processor 50 further communicates with the pads 26 and light arrays 29 of playing surface 16 through controller 56. Controller 56 further provides an interface from processor 50 to the various potentiometers, soft switches, and other controls, both physical and virtual, of user interface 14, for buffering, formatting and transmitting various user-defined data, control signals and display data to and from processor 50. A memory control unit 54 interfaces with memory 55 for retrieving data, such as stored audio data files, representing previously sampled sounds, as well as records or data structures 53 storing various user-defined data including kit definitions, pad parameters, lighting mode parameters, effects settings, groupings of pads/triggers/footswitches, global settings and various other user preferences. The plurality of control signal patterns which selectively illuminate the lighting elements 28A-D of any of arrays 29 may be stored in either controller 56 or memory 55. Play surface 16 communicates with processor 50 through controller 56 configurable for receiving and sending trigger signals to and from pads 26 and sending control signals to lighting elements 28A-D including the various patterns described herein. In other embodiments, processor 50 may be implemented with a general purpose microprocessor in conjunction with the other digital logic components and support circuitry described herein for interfacing with user interface 14, pads 26 and lighting elements 28 of playing surface 16.

Figure 6:
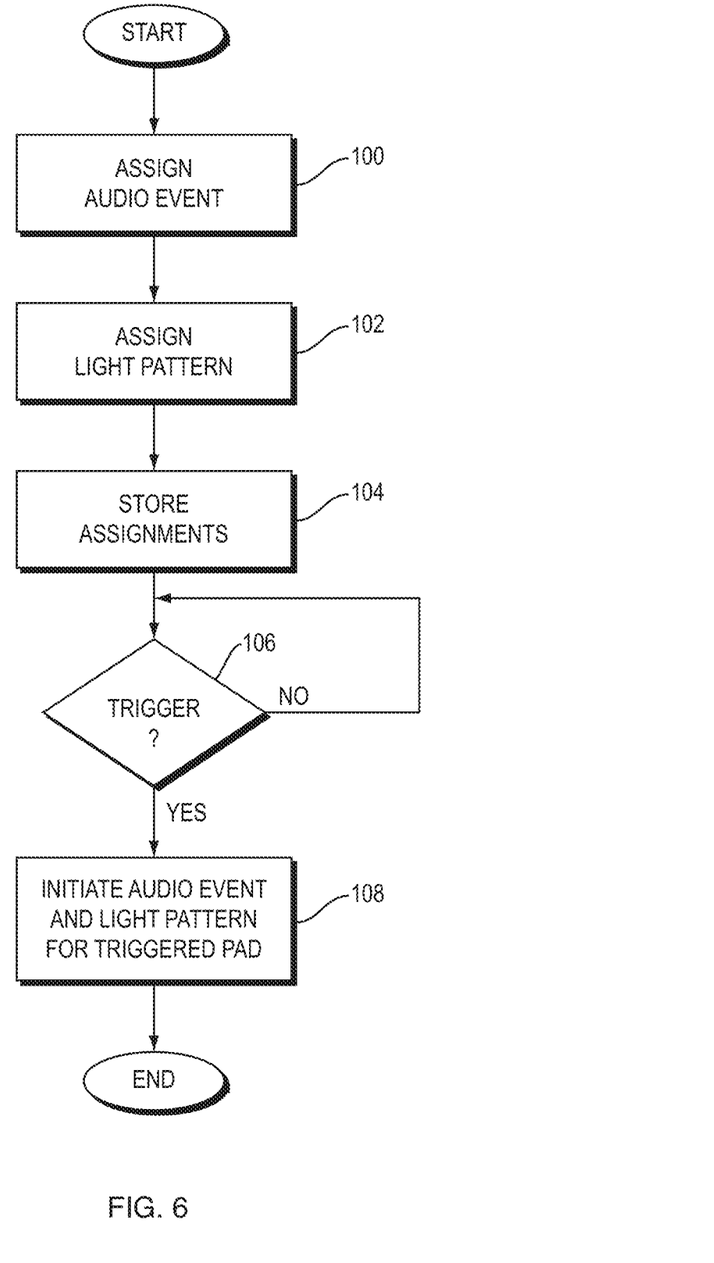
FIG. 6 illustrates conceptually a flowchart of the process for providing an animated visual cue associated with triggering of a pad in an electronic percussion device in accordance with the disclosure.

FIG. 6 illustrates conceptually a flowchart of the process for defining an animated pattern for a light array 29 to be displayed upon triggering of the associated pad 26A-I. To begin, a user defines one or more kits or recalls predefined kits for customization. A user may define parameters of individual pads, such as assigning an audio event, e.g. playback of a specific prerecorded audio data file or execution of control function, to each of the pads associated with a kit, as illustrated by procedural block 100. Similarly, a user may assign a control pattern, such as any of the Trigger, Audio Meter, Audio Breath, Filll, BPM Pulse or BPM Pong modes described herein, for controlling the illumination characteristics of a light array 29, as illustrated by procedural block 102. Next, the user saves any of the kit definitions, pad parameters, and lighting mode assignments to memory, as illustrated by procedural block 104. Once in the memory, if the kit is selected, the system will scan all the pads, triggers and foot switches for a trigger signal. If a pad is triggered, as illustrated by decisional step 106, the appropriate audio event, e.g. playback of a prerecorded sample, loop, or backing track, or execution of control function, will be initiated along with illumination of the lighting elements 28A-D in the array 29 associated with the pad 26 which has been triggered, as illustrated by process block 108. The process defined by blocks 100-104 is typically repeated for actuators or pads and/or kits prior to commencing a musical performance, while the process of step 106 and block 108 may occur repeatedly throughout a musical performance.

For example, assuming that a user has defined a pad 26 to trigger playback of a prerecorded audio sample loop, e.g. the audio event, and the illumination characteristics of the associated array 29 had been selected to animate the playback duration of the loop, e.g. the Fill mode, upon triggering of the pad, the loop playback will commence and, during playback, a continual right to left pattern illuminating the adjacent of the lighting elements 28A-D sequentially will occur as long as playback of the loop is in progress, thereby indicating to the user that the loop associated with the pad is still in the process of being playback. Similarly, assuming that the user defined pad 26 to trigger playback of a single sample, e.g. the audio event, and the illumination characteristics of the associated array 29 had been selected to represent a signal meter (left to right) for the volume of the audio sample playback triggered by the pad, e.g. the Audio Meter mode, upon triggering of the pad, the sample will begin playback and a dynamic real-time metering pattern illuminating adjacent of the lighting elements will in relationship to the instantaneous playback volume of the sample associated with pad 26 will be illustrated. Note that the audio metering may also be used with a loop, as well.

FIG. 7 is a rear plan view of the electronic percussion device 10, illustrating conceptually the various ports of audio interface 35, as connectable to external devices. More specifically, electronic percussion device 10 is connectable via the power input port 40 to a power source via a transformer in a matter understood the relevant arts. A power switch 39 is provided to power the device 10. A main report 41, implemented as a USB port in the rear panel is capable of accepting a USB flash drive or other USB connectable devices to facilitate loading and saving of audio data files, such as .WAV files, kit configurations and global settings of percussion device 10. A USB MIDI port 42, in the form of a standard USB cable port, is connectable to the USB port of a computer or other processing device to send and receive MIDI and audio information to and from a computer. A pair of five pin DIN MIDI connectors 43A-B for both a MIDI input and MIDI through, respectively, are provided for connection to any external MIDI devices such as an electronic drum set. Two pairs of stereo main and auxiliary audio outputs 44A-B, respectively, are provided to connect the device 10 to loudspeakers or audio interfaces, etc. A set of trigger input ports 45A-D are provided for connection to external electronic trigger devices, such as an external trigger drum pad. A pair of stereo recording inputs 46A-B are provided to connect device 10 to audio sources such as smart phones, microphones, instruments, mixers or other devices, such inputs capable of being passed by the audio interface 35 to any of the main or auxiliary or headphone outputs of the device 10, as selectable through the user interface 14. A potentiometer 47 is provided to set the gain level of the recording inputs accordingly. A headphone audio output port (not shown) is provided in the front panel of device 10 to connect the device 10 to headphones. A pair of foot controller inputs 48A-B are connectable to foot switches to enable additional sound or control functions within device 10.

Although the illustrative environment has been described in which the plurality of lighting elements 28 are arranged linearly into an array 29, other arrangements are possible while still enabling the various animation techniques described herein. For example, the multiple lighting elements may be arranged in any of a non-straight line pattern such as a curve, arc, circle or portion thereof or even arrangement juxtaposed into a geometric shape such as a rectangular.

Further, although the illustrative embodiment of the device 10 has been described predominately with the playback of audio samples, the same animation techniques described herein may be utilized with an electron a percussion device which generates audio signals dynamically in real time, with either analog or digital circuit elements, or a hybrid combination of both, in place of, or in addition to the ability to playback audio samples.

In other embodiments, the patterns of control signals from processor 50 or controller 56 for controlling the lighting elements 28A-D may be made available externally of the device 10 for driving external displays, matrices of lighting elements, or other devices to provide even larger visual cue for not only the percussionist but as possible visual accompaniment for the audience.

In still other embodiments, the animated patterns of the lighting elements 28 may be dynamically triggered by real time audio streams being processed through the electronic percussion device 10, with the instantaneous amplitude or various other characteristics, including any MIDI parameters, of the audio stream being used to trigger illumination of the light array 29 of an associated pad, with one or more of the various lighting mode patterns described herein.

In yet another embodiments, the pads 26 of playing surface 16 may be replaced with different actuator element, including smaller pads, e.g. finger pads, which may have any of velocity sensitivity, after pressure sensitivity, force sensitivity, or no sensitivity, or a keyboard device in which any of the respective keys serve as the actuator element with light array 29, as described herein for implementing the various animated lighting patterns as set forth herein.

According to another aspect of the disclosure, the electronic percussion device 10 may have an operational mode in which a pad may have the ability to trigger the audio events associated with other pads in a user defined group in different synchronization modes, e.g. simultaneously or in different sequential orders. More specifically, in the illustrative embodiment, the disclosed electronic percussion device 10 is configurable with nineteen actuators: nine pads, six external trigger inputs, and four footswitches, all of which can be synchronized as a group allowing the user to trigger from any actuator in the group, audio events associated with the other actuators in the group, either simultaneously or in different sequential orders, e.g. cyclically or randomly.

In a synchronization or "sync" mode, selectable through the user interface, the user may define how actuators within the same synchronized group are triggered. With a sync setting, all actuators in the group will mute each other when triggered so that only one audio event is in playback mode at a time within the group. With a cyclical setting, the pads of the sync group will be triggered in consecutive order from pads P1-9, two external triggers T1-6, to foot switches FS1-4 in a "round robin" manner, with re-triggering of the next actuator in the consecutive order sequence occurring from any of the pads within the defined sync group. With a random setting, the actuators in a sync group will trigger in random order, with re-triggering of the next actuator in the random order sequence occurring from any of the pads within the defined sync group. With a together setting, up to nine pads in the sync group will play at the same time, with the triggering of only one of the actuators within the sync group. The user can assign any of these pads, trigger inputs, and footswitches to "groups", whereby if the user triggers one of the pads in the group, all of the pads in the group perform and function accordingly. Such modes are made possible by storing within a data structure 53 in memory 55 an identifier of each of the actuators associated with the group along with their respective audio events, e.g. simple playback or execution of a control function. Alternatively, existing pad records may be organized in memory as a linked list or doubly linked list which can then be recalled upon invoking one of the synchronization modes.

Figure 9:
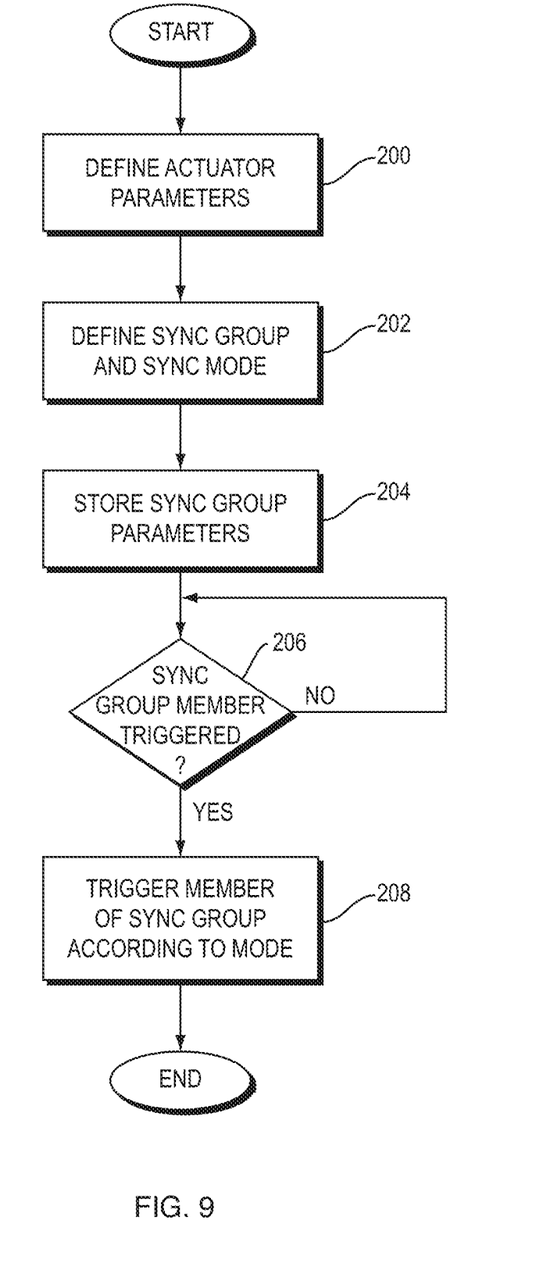
FIG. 9 illustrates conceptually a flowchart of the process for grouping together multiple of the pads, external triggers and foots for triggering either synchronously or sequentially in accordance with the disclosure.

FIG. 9 illustrates conceptually a flowchart of the process for grouping together multiple of the pads, external triggers and foots for triggering either synchronously or sequentially. To begin, a user defines one or more kits or recalls predefined kits for customization. A user may define parameters of individual actuators, such as assigning an audio event, e.g. playback of a specific prerecorded audio data file or execution of control function, to each of the pads associated with a kit, as illustrated by procedural block 200. Similarly, a user may assign one or more actuator to a synchronization group, and define the synchronization mode, as illustrated by procedural block 202. The illustrative embodiment, each kit can have up to 16 sync groups. Next, the user saves any of the kit definitions, including sync group assignments as well as sync modes to memory, as illustrated by procedural block 204. Once in the memory, if the kit is selected, sync group assignments as well as sync modes will be active, the system will scan all the pads, triggers and foot switches within the sync group for a trigger signal. If an actuator within the sync, typically a pad, is triggered, as illustrated by decisional step 206, synchronized triggering of the actuators within the sync group will occur in accordance with the selected sync mode value, e.g. one at a time, all simultaneously, random or in a predefined or user-defined consecutive order, as illustrated by process block 208. The process defined by blocks 200-204 is typically repeated for kits prior to commencing a musical performance, while the process of step 206 and block 208 may occur repeatedly throughout a musical performance.

The reader will appreciate the disclosed system and methods help to provide visual cue associated percussive audio events to assist a percussionists in understanding the synchronization and dynamic playback characteristics of audio events triggered from an electronic percussion device.

Certain embodiments of the present disclosure can be implemented as software on a general-purpose computer or on another device.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents falling within the scope of the disclosure may be resorted to.

Computer programs, program modules, and code based on the written description of this specification, such as those used by the microcontrollers, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

Another aspect of the disclosure is directed to a non-transitory computer-readable medium storing instructions which, when executed, cause one or more processors to perform the methods of the disclosure. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Moreover, while illustrative embodiments have been described herein, the scope of any and all embodiments include equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for a visualizing characteristics of an audio event comprising:
    a triggerable pad having a striking surface, defined by a perimeter, for initiating an audio event having a plurality of characteristics;
    a plurality of lighting elements associated with the pad and arranged proximate the pad striking surface and outside the striking surface perimeter; and
    a controller operatively coupled to the pad and the plurality of lighting elements and responsive to user defined criteria identifying illumination characteristics of the plurality of lighting elements, the controller further having an operational mode to control the illumination characteristics of the plurality lighting elements upon triggering of the pad.

2. The system of claim 1 further comprising:
    a user interface operatively coupled to the controller for receiving user defined criteria identifying illumination characteristics of the plurality of lighting elements.

3. The system of claim 1 further comprising:
    a memory for storing a plurality control signals capable of controlling the plurality lighting elements.

4. The system of claim 1 further comprising:
    a user interface for receiving user defined criteria identifying characteristics of the audio event.

5. The system of claim 1 further wherein the audio event comprises playback of audio data.

6. The system of claim 1 further wherein the plurality of lighting elements are arranged in an array.

7. The system of claim 6 further comprising a light diffuser element disposed over the array.

8. The system of claim 1 wherein the pad is touch sensitive.

9. The system of claim 8 wherein the touch sensitive pad has a user definable force threshold at which the pad is triggered.

10. The system of claim 8 wherein the controller changes a brightness illumination characteristic of the plurality of lighting elements from a first brightness level to a second brightness level when the pad is triggered.

11. The system of claim 10 wherein the controller changes the brightness illumination characteristic of the plurality of lighting elements uniformly from a first brightness level to a second brightness level when the pad is triggered.

12. The system of claim 10 wherein the controller changes the brightness illumination characteristic of the plurality of lighting elements non-uniformly when the pad is triggered.

13. The system of claim 12 wherein the plurality of lighting elements are arranged into a linear array, and wherein the controller changes the brightness illumination characteristic of adjacent of the plurality of lighting elements directionally in relation to a characteristic of the audio event associated with the pad upon triggering thereof.

14. The system of claim 13 wherein the characteristic of the audio event comprises a volume characteristic of an audio signal generated by playback of audio data.

15. The system of claim 13 wherein the characteristic of the audio event comprises a force characteristic with which the pad is triggered.

16. The system of claim 13 wherein the characteristic of the audio event comprises a playback duration characteristic of an audio signal generated by playback of audio data.

17. A method for a visualizing characteristics of an audio signal comprising:
   A) obtaining a system comprising:
      i) a triggerable pad having a striking surface, defined by a perimeter, for initiating an associated audio event having a plurality of characteristics;
      ii) a plurality of lighting elements associated with the pad and arranged proximate the pad striking surface and outside the striking surface perimeter;
      iii) a controller operatively coupled to the pad and the plurality of lighting elements and responsive to user criteria defining lighting characteristics of the plurality of lighting elements upon triggering of the pad;
   B) receiving user criteria defining lighting characteristics of the plurality of lighting elements; and
   C) selectively illuminating the plurality of lighting elements in accordance with the user criteria upon triggering of the audio event associated with the pad.

18. The method of claim 17 wherein C) comprises changing, with the controller, a brightness level lighting characteristic of all of the plurality of lighting elements uniformly upon triggering the audio event associated with the pad.

19. The method of claim 17 wherein C) comprises changing, with the controller, a brightness level lighting characteristic of the plurality of lighting elements non uniformly upon triggering the audio event associated with the pad.

20. The method of claim 19 wherein the plurality of lighting elements are arranged into a linear array, and wherein C) comprises changing, with the controller, the brightness illumination characteristic of adjacent of the plurality of lighting elements directionally in relation to a characteristic of the audio event associated with the pad upon triggering thereof.

21. The method of claim 20 wherein the characteristic of the audio event comprises a volume characteristic of an audio signal at playback.

22. The method of claim 20 wherein the characteristic of the audio event comprises a force characteristic with which the pad is triggered.

23. The method of claim 20 wherein the characteristic of the audio event comprises a playback duration characteristic of an audio signal upon triggering of the pad.

24. The method of claim 17 wherein the pad comprises a touch sensitive pad.

25. A system for a visualizing characteristics of an audio event comprising:
   a triggerable pad having a striking surface, defined by a perimeter, for initiating an audio event having a plurality of characteristics;
   a plurality of lighting elements associated with the pad and arranged proximate the pad striking surface and outside the striking surface perimeter;
   a memory for storing a plurality control signal patterns capable of controlling illumination characteristics of the plurality lighting elements; and
   a controller operatively coupled to the pad, the memory and the plurality of lighting elements and responsive to user defined criteria identifying one of the control signal patterns, the controller further having an operational mode to control the illumination characteristics of the plurality lighting elements upon triggering of the pad, wherein, in at least one of the plurality of control signal patterns, at least one but less than all of the plurality of lighting elements associated with the pad are illuminated during the audio event.

26. An electronic percussion apparatus comprising:
   a plurality of triggerable pads, each pad having a striking surface, defined by a perimeter, and having an associated audio sample or control function operable upon triggering thereof;
   a plurality of lighting elements associated with the pad and arranged proximate the pad striking surface and outside the striking surface perimeter;
   a memory for storing the audio sample or control function associated with each of the plurality of triggerable pads; and
   a controller operatively coupled to the plurality of triggerable pads and memory and having an operational mode capable of initiating, in an order, one of playback of the audio sample or operation of the control function associated with each of the plurality of pads by re-triggering of a single of the plurality of pads.

27. The electronic percussion apparatus of claim 26 wherein the order of initiation is random.

28. The electronic percussion apparatus of claim 26 wherein the order of initiation is consecutive according to a predefined pattern.

\* \* \* \* \*